US008220439B2

(12) United States Patent
Fisher

(10) Patent No.: US 8,220,439 B2
(45) Date of Patent: Jul. 17, 2012

(54) DUAL FUEL SYSTEM

(75) Inventor: Will Fisher, Brisbane (AU)

(73) Assignee: DGC Industries Pty. Ltd., Victoria Point, Brisbane, Queensland (AU)

(*) Notice: Subject to any disclaimer, the term of this patent is extended or adjusted under 35 U.S.C. 154(b) by 472 days.

(21) Appl. No.: 12/311,084

(22) PCT Filed: Sep. 21, 2007

(86) PCT No.: PCT/AU2007/001396
§ 371 (c)(1),
(2), (4) Date: May 26, 2009

(87) PCT Pub. No.: WO2008/036999
PCT Pub. Date: Apr. 3, 2008

(65) Prior Publication Data
US 2009/0320786 A1    Dec. 31, 2009

(30) Foreign Application Priority Data

Sep. 25, 2006  (AU) ............................... 2006905242
Mar. 30, 2007  (AU) ............................... 2007901668

(51) Int. Cl.
F02M 21/02 (2006.01)
(52) U.S. Cl. ........................................ 123/525; 123/304
(58) Field of Classification Search .............. 123/27 GE, 123/525, 526, 304
See application file for complete search history.

(56) References Cited

U.S. PATENT DOCUMENTS

| | | | |
|---|---|---|---|
| 2,866,693 A * | 12/1958 | Allen | .............................. 585/14 |
| 4,520,766 A | 6/1985 | Akeroyd | |
| 4,535,728 A | 8/1985 | Batchelor | |
| 4,909,209 A | 3/1990 | Takahasi | |
| 5,408,957 A | 4/1995 | Crowley | |
| 6,142,107 A | 11/2000 | Stutzenberger | |
| 6,234,151 B1 | 5/2001 | Eck | |
| 6,427,660 B1 | 8/2002 | Yang | |
| 6,626,162 B2 | 9/2003 | Shelor et al. | |
| 6,971,370 B2 | 12/2005 | Suenaga et al. | |
| 7,019,626 B1 | 3/2006 | Funk | |
| 7,444,986 B2 | 11/2008 | Shute | |

(Continued)

FOREIGN PATENT DOCUMENTS

DE    102 45 161 A1    4/2004

(Continued)

OTHER PUBLICATIONS

International Preliminary Report on Patentability issued on Oct. 28, 2008, for PCT/AU2007/001396; 3 pages.

(Continued)

Primary Examiner — Noah Kamen
(74) Attorney, Agent, or Firm — Mueting, Raasch & Gebhardt, P.A.

(57) ABSTRACT

The present invention is directed to a dual fuel system and a dual fuel system assembly where liquid LPG and diesel are mixed and then distributed via the common rail to the combustion chambers. The liquid fuel mixture remains in a liquid state and under pressure for introduction to the combustion chambers. With the preferred embodiment of the dual fuel system, only minor changes are required to the diesel engine without altering the manufactures specifications and voiding the manufacturer's warranties. The resultant combustion of the liquid fuel mixture provides a cleaner emission and relatively cheaper vehicle operational costs.

13 Claims, 3 Drawing Sheets

U.S. PATENT DOCUMENTS

| | | |
|---|---|---|
| 2005/0081825 A1 | 4/2005 | Suenaga et al. |
| 2005/0205021 A1 | 9/2005 | Shute |

FOREIGN PATENT DOCUMENTS

| | | |
|---|---|---|
| DE | 203 10 824 U1 | 12/2004 |
| DE | 10 2004 011 414 A1 | 4/2005 |
| DE | 10 2007 028 816 A1 | 5/2008 |
| EP | 1 785 618 B1 | 1/2009 |
| EP | 2 069 627 B1 | 2/2011 |
| GB | 1 252 458 | 11/1971 |
| JP | 59-162337 A | 9/1984 |
| JP | 59162337 A * | 9/1984 |
| JP | 1-318755 | 12/1989 |
| JP | 3-189361 A | 8/1991 |
| JP | 2005-061401 A | 3/2005 |
| WO | WO 99/20890 A1 | 4/1999 |
| WO | WO 2006/096271 A2 | 9/2006 |
| WO | WO 2006/096271 A3 | 10/2007 |
| WO | WO 2008/036999 A1 | 4/2008 |
| WO | WO 2008/141390 A1 | 11/2008 |
| WO | WO 2010/121305 A1 | 10/2010 |
| WO | WO 2010/121306 A1 | 10/2010 |

OTHER PUBLICATIONS

International Search Report issued on Nov. 9, 2007, for PCT/AU2007/001396; 3 pages.

Written Opinion of the International Searching Authority issued on Nov. 9, 2007, PCT/AU2007/001396; 5 pages.

Communication Regarding the Intent to Grant issued Aug. 25, 2010, in European Patent Application No. 07815214.7, filed Sep. 21, 2007; 6 pages.

Decision to Grant issued Jan. 13, 2011, in European Patent Application No. 07815214.7, filed Sep. 21, 2007; 2 pages.

Extended European Search Report issued Sep. 9, 2001, in European Patent Application No. 07815214.7, filed Sep. 21, 2007; 6 pages.

International Search Report issued Jul. 1, 2010, in International Patent Application No. PCT/AU2010/000449, filed Apr. 20, 2010; 4 pages.

International Search Report issued Jun. 29, 2010, in International Patent Application No. PCT/AU2010/000450, filed Apr. 20, 2010; 4 pages.

* cited by examiner

DUAL FUEL SYSTEM

This application is a U.S. National Stage Application of International Application No. PCT/AU2007/001396, filed 21 Sep. 2007, which claims the benefit of Australian Patent Application Nos. AU 2006905242, filed 25 Sep. 2006 and AU 2007901668, filed 30 Mar. 2007, each of which is incorporated herein by reference in its entirety.

FIELD OF INVENTION

The present invention relates to diesel engines and fuel systems for diesel engines. The present invention has particular but not exclusive application for use with trucks.

BACKGROUND OF THE INVENTION

Trucks and in particular long haul trucks use large volumes of diesel fuel in transporting goods. As the price of diesel increases, the cost of freighting goods also increases. While at least part of the increase in costs is passed on to the end consumer, market forces have caused the truck operator to absorb much of the additional costs thereby reducing their profit margin. Consequently alternative fuel sources have been investigated.

LPG (Liquid Petroleum Gas) has been used as an alternative fuel source for diesel engines. While LPG is stored under pressure (approximately 150 psi) in the tank which maintains the LPG in a liquid state, LPG is usually used in a gaseous state at pressures well below 140 psi which is the pressure required to maintain LPG in a liquid state.

LPG has also been used with diesel in dual fuel systems. In US2005205021 a separate set of injectors introduce gaseous LPG into the combustion chamber, whereas in U.S. Pat. No. 5,408,957, U.S. Pat. No. 4,520,766, JP1318755 and GB1252458, gaseous LPG is mixed with air prior to introducing the air mixture to the combustion chamber.

The problem with using LPG as the sole fuel source for diesel engines is that the engines need substantial modification to overcome the reduction in lubricity with the use of LPG and the ability to provide the combustion of the LPG. Modification of engines is a major expense and voids the warranties from the engine manufacturer. Even with LPG and diesel dual fuel systems, diesel engines need to be modified to allow the introduction of LPG into the combustion chamber.

OBJECT OF THE INVENTION

It is an object of the present invention to provide an alternative dual fuel system that overcomes at least in part the abovementioned problems.

SUMMARY OF THE INVENTION

The present invention arose from taking an alternative approach by understanding the effects of pressure on LPG and developing a different solution to dual fuel systems using pressurized LPG and without substantially modifying the diesel engine.

In one aspect the present invention broadly resides in a dual fuel system for use by an internal combustion diesel engine including a fuel tank to store pressurized liquefied gas;

a proportioning valve means operatively connected to the fuel tank and adapted to control the flow of the liquefied gas; and a mixing chamber operatively connected to the proportioning valve and adapted to mix a proportioned flow of the liquefied gas and a proportioned flow of diesel to form a liquid fuel mixture, wherein the liquid fuel mixture remains under pressure and is introduced into a combustion chamber of the diesel engine.

In another aspect the present invention broadly resides in a dual fuel system assembly for installation with an internal combustion diesel engine including a fuel tank to store pressurized liquefied gas;

a proportioning valve means operatively connectable to the fuel tank and adapted to control the flow of the liquefied gas; and a mixing chamber operatively connectable to the proportioning valve and adapted to mix a proportioned flow of the liquefied gas and a proportioned flow of diesel to form a liquid fuel mixture, wherein in use the assembly can provide the liquid fuel mixture to a combustion chamber of the diesel engine.

The proportioning valve means preferably includes a flow control valve operatively controlled by an electronic control board. The electronic control board preferably controls the flow control valve in response to processed information from the vehicle electronic control unit.

Preferably the diesel fuel is pressurized prior to entering the mixing chamber. The diesel fuel is preferably pressurized by an inline pump and the fuel is stored within a pressurized tank prior to use. Preferably the supply of pressurized diesel fuel to the mixing chamber is regulated by a flow control valve that is operatively controlled by an electronic control board. The electronic control board is preferably controlled by the vehicle electronic control unit that receives and processes information to provide a relevant signal to the electronic control board.

The liquefied gas is preferably filtered before the proportioning valve with an inline filter.

Preferably the LPG tank, proportioning valve means and mixing chamber are linked by a gas pipeline.

The pipeline between the LPG tank and proportioning valve preferably includes at least one closeable valve. In a preferred embodiment there is a one-way non-return valve and a closeable valve within the line between the LPG tank and the proportioning valve means.

The dual fuel assembly may be fitted prior to delivery of a diesel engine vehicle or fitted as an after market kit.

The liquefied gas may be LPG, propane, natural gas or compressed natural gas.

Preferably the liquefied gas tank stores LPG under pressure of about 150 psi but above its vapor pressure of 80 psi.

In a further aspect the invention broadly resides in an internal combustion diesel engine with dual fuel system including a first tank to store pressurized liquefied gas;

a second tank to store pressurized diesel;

a first proportioning valve means operatively connected to the first tank and adapted to control the flow of the liquefied gas;

a second proportioning valve means operatively connected to the second tank and adapted to control the flow of the diesel;

a mixing chamber operatively connected to the first proportioning valve means and second proportioning valve means, said mixing chamber is adapted to mix a proportioned flow of the liquefied gas and a proportioned flow of diesel to form a liquid fuel mixture, and distribution means for distributing the liquid fuel mixture to each internal combustion chamber, wherein an engine processor controls the proportioning of the fuels by regulating the respective proportioning valve means in accordance with demand.

The abovementioned preferred embodiments for the features of the dual fuel system and dual fuel system assembly also apply for this aspect of the invention.

The second tank preferably receives pressurized diesel via an inline filter and pump from a diesel fuel tank.

The second proportioning valve means preferably includes a flow control valve operatively controlled by an electronic control board. The electronic control board preferably controls the flow control valve in response to processed information from the vehicle electronic control unit. The vehicle electronic control unit receives and processes input regarding the demand of fuel by the engine.

Preferably there is an accelerometer means that measures the acceleration of the vehicle and whether the vehicle is traveling up or down an incline. Input from the accelerometer means preferably operatively regulates the diesel and liquefied gas flow control valves via the respective electronic control boards. The accelerometer inputs are preferably processed by the electronic control unit.

The ratio of LPG to diesel may vary between 50:50 and 90:10 respectively. More preferably the ratio of LPG to diesel is approximately 70:30 respectively. Preferably any ratio is suitable providing the engine components are not prematurely worn because of lack of lubricity and the manufacturer's warranties are not voided and the calorific value of the fuel is sufficient to allow the engine to produce an acceptable amount of power and torque.

The liquid fuel mixture is preferably pumped to a common rail operable under high pressure so that the liquid fuel mixture remains in a liquid state. The phrase common rail in the specification includes common rails and fuel rails. Preferably, the common rail is connected to an injector for each combustion chamber and the fuel mixture is distributed to each of the injectors for combustion in accordance with the manufacturer's specifications.

Preferably the fuel mixture is filtered prior to distribution in the common rail.

Excess unburnt fuel mixture is preferably collected in a overflow tank and returned to the mixing chamber for combustion in the combustion chamber. More preferably, excess fuel mixture is returned via a fuel temperature sensor to a fuel pressure limiter then to an overflow valve and a pressure limiting valve. Excess fuel is then preferably passed through a fuel cooler and maintained under pressure in a pressurized tank for subsequent reintroduction into the mixing chamber.

Preferably there is a separate line from the diesel tank to the supply pump and subsequently to the common rail for the engine to use diesel as the sole fuel source.

In another aspect the invention broadly resides in a method of using the above mentioned dual fuel system for an internal combustion diesel engine including proportioning flow of liquefied gas from the first tank with the first proportioning valve means;

proportioning flow of diesel from the second tank with the second proportioning valve means;

mixing proportioned fuels to form a liquid fuel mixture in the mixing chamber;

distributing the liquid fuel mixture from the mixing chamber to each of the combustion chambers.

BRIEF DESCRIPTION OF THE DRAWINGS

In order that the present invention can be more readily understood and put into practical effect, reference will now be made to the accompanying drawings wherein.

DETAILED DESCRIPTION OF THE PREFERRED EMBODIMENT

Figure 1:
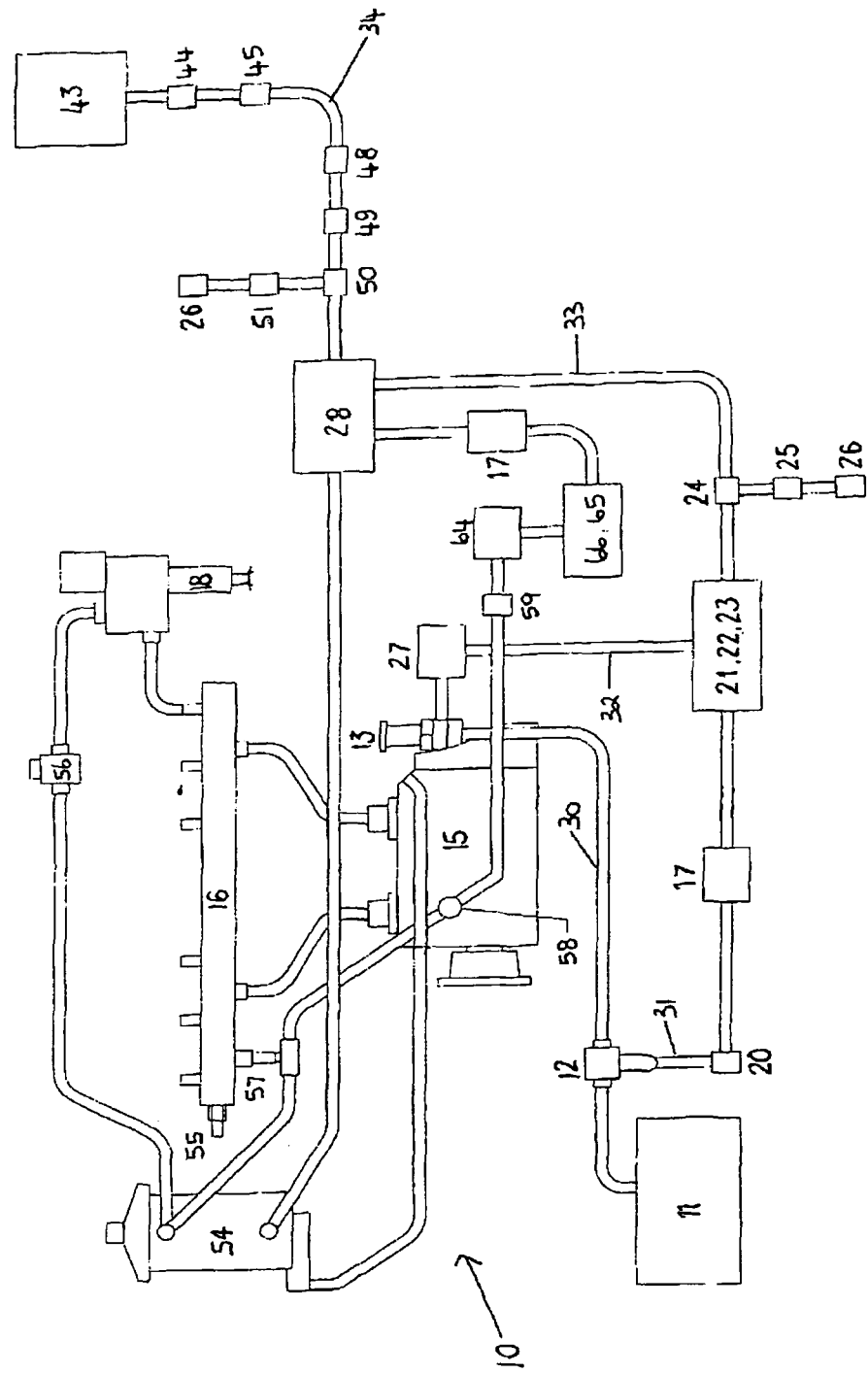
FIG. 1 is a diagrammatic view of the preferred embodiment of the dual fuel system for diesel engines.

With reference to FIG. 1, there is shown a dual fuel system 10 for a diesel engine for trucks. Diesel is introduced from a service station pump at atmospheric pressure into tank 11. In a first pathway, diesel is drawn from tank 11 along pipe 30 via an inline filter 12 by fuel feeder pump 13. Fuel feeder pump 13 operates at a pressure of approximately 30 psi. The inline filter 12 is a glass filter that removes contaminants. The diesel fuel is subsequently pumped by supply pump 15 to the common rail 16 for entry into the combustion chamber via injectors 18. With the first pathway, diesel is used as the sole fuel source for combustion within the combustion chamber of the engine.

In a second pathway, diesel is drawn from tank 11 by secondary fuel feeder pump 20 along pipe 31. The diesel from tank 11 is filtered by the inline filter 12 as it is being drawn by the secondary fuel feeder pump 20. From the secondary fuel feeder pump 20, diesel is passaged through a non-return valve 17 to a secondary diesel pressure tank 21. The pressure within the secondary diesel pressure tank 21 is maintained at approximately 100 psi. The secondary diesel pressure tank 21 has an approximately 43 litre capacity. The secondary diesel pressure tank 21 has a pressure switch 22 which electrically controls the secondary fuel feeder pump 20 thereby maintaining the desired pressure. The secondary diesel pressure tank 21 also has a bleed valve to bleed any air within the line 31 and secondary diesel pressure tank 21. There is also a line 32 between the fuel feeder pump 13 and the secondary diesel pressure tank 21 to enable diesel passaging line 30 to enter the secondary diesel pressure tank 21. There is a non-return valve 27 in line 32 that prevents diesel from the secondary diesel pressure tank 21 passaging to the fuel feeder pump 13.

Pressurized diesel from the secondary diesel pressure tank 21 is passaged along line 33 to the mixing chamber 28. The flow of pressurized diesel along line 33 is controlled by a diesel flow control valve 24. The diesel control valve 24 is electrically operated by a diesel electronic controller 25 which in turn is actuated by the electronic control unit 26. The electronic control unit 26 processes information regarding revolutions per minute of the engine from a crank angle sensor. Pressurized diesel passes through the diesel flow control valve 24 and enters the mixing chamber 28 at a pressure of approximately 100 psi.

LPG is introduced into tank 43 from a service station pump where the tank 43 is filled under the pressure of approximately 150 psi in liquid state. LPG is stored under pressure at 150 psi in liquid state. Liquid LPG passes through pipe 34 via shut off valve 44, in line filter 45, solenoid valve 48 and non-return valve 49 to an LPG flow control valve 50. The LPG flow control valve 50 is electrically operated by a LPG electronic controller 51 which is actuated by the electronic control unit 26. Pressurized liquid LPG enters the mixing chamber 28 at approximately 100 psi.

Figure 2:
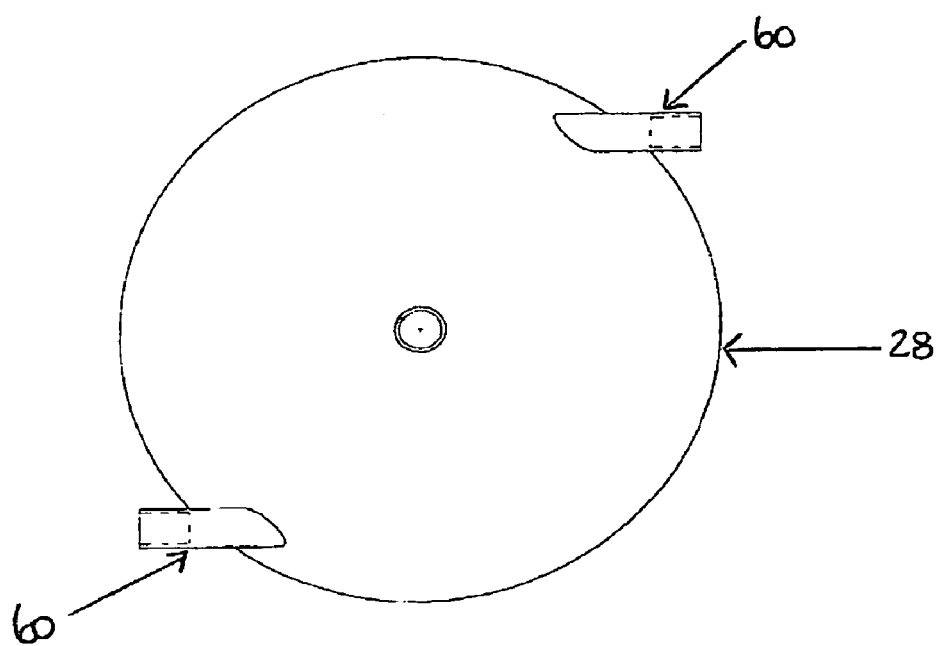
FIG. 2 is a diagrammatic top view of the mixing chamber using Swage Lock proportioning valves as an alternative to the electronic control system.
Figure 3:
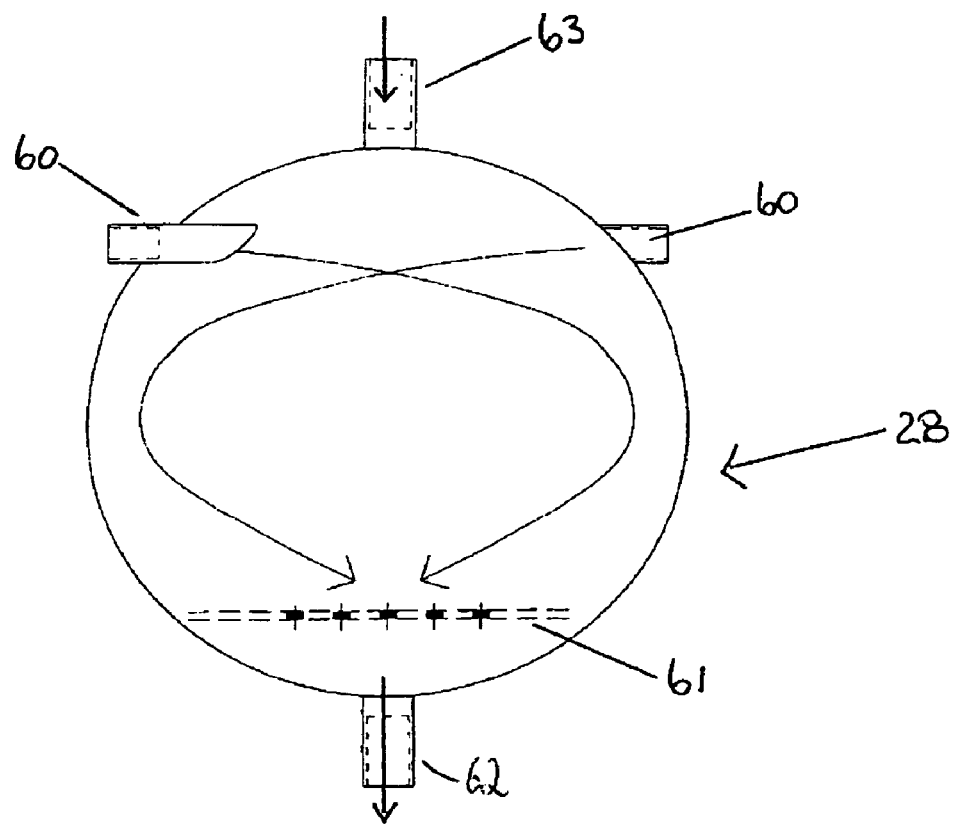
FIG. 3 is a diagrammatic side view of the mixing chamber using Swage Lock proportioning valves as an alternative to the electronic control system.

Both the pressurized diesel and liquefied LPG enter the mixing chamber 28. The mixing chamber 28 is shown in both FIGS. 2 and 3. As an alternative to the electronic control flow valve system, ¼ NPT Swage Lock Proportioning Valves 60 can be used and are preferably locked at a predetermined ratio setting.

The mixing chamber 28 is substantially spherical with the proportioning valves 60 are positioned spatially diagonally opposite each other. The mixing chamber 28 has an internal wire mesh 61 to facilitate mixing of the fuels. The mixed fuel is discharged via outlet 62 and excess mixed fuel is reintroduced via inlet 63.

A preferred ratio of fuels is 30% diesel and 70% LPG. However, there is a range of ratios from 10% diesel and 90% LPG to 90% diesel and 10% LPG. Ratios of fuel blends which use less than 30% diesel can be achieved where the lubricity of the fuel mix is increased. In particular, low sulphur diesel which undergoes additional filtration treatment has reduced lubricity and fuel blends below a diesel percentage of 30% requires additional lubricity in order to maintain engine components.

Apart from regulating the diesel and LPG flow control valves 24, 50, in response to engine revolutions per minute, the flow control valves 24, 50 are also regulated by accelerometer inputs which provide information regarding traveling up and down inclines. The accelerometer inputs are processed by the electronic control unit 26.

From the mixing chamber 28 the liquid fuel mixture is drawn through a secondary fuel filtration unit 54 by the supply pump 15. From the secondary fuel filtration unit 54, the liquid fuel mixture is drawn into the supply pump 15 and pumped to the common rail 16 at high pressure. The common rail 16 distributes the liquid fuel mixture to the injectors 18 of each combustion chamber (not shown). Only one injector 18 is shown in FIG. 1 by way of example. There is also a fuel pressure sensor 55 associated with the common rail 16.

Excess fuel mixture that is not burnt is returned from each injector 18 via a fuel temperature sensor 56. Excess fuel mixture associated with the common rail 16 is returned via pressure limiter 57. Excess fuel mixture is piped to the overflow valve 58 through pressure limiting valve 59, fuel cooler 64 to the mixed fuel pressure tank 65. The mixed fuel pressure tank 65 has a bleed valve 66 which allows removal of air from the fuel lines and tank 65. From the mixed fuel pressure tank 65, the fuel mixture is drawn up into the mixing chamber 28 for return to the common rail 16 and combustion chambers.

Emission Test Results

By way of providing support for the dual fuel system of the current invention, emission tests were conducted by an independent third party, Brisbane City Council and the results were analyzed by Gilmore Engineers Pty Ltd. Two tests were conducted when the vehicle used diesel only and LPG/diesel (at a ratio of 70% LPG and 30% diesel). The diesel only test (test 2969) was conducted on 27 Mar. 2007 using the DT80 short test. The LPG/diesel test (test 3262) was conducted on 17 May 2007 using the DT80 short test. The same vehicle was used for both tests. The vehicle was an ISUZU (950 FVR) truck with a vehicle test mass of 13000 kg. The DT80 short test was a series of rapid accelerations and decelerations interspersed with idling and is designed to evaluate vehicle emissions during typical "real world" stop start operating modes and conditions.

The emission test results are summarized below:

| | UNITS | DIESEL ONLY (Test 2969) | LPG/DIESEL (Test 3262) | DNEPM Limits |
|---|---|---|---|---|
| $NO_x$ | g/kWh | 6.211 | 0.380 | |
| (Nitrous Oxide) | g/km · t | 0.707 | 0.686 | 1.5 |
| PM LLSP | mg/kWh | 80.194 | 26.325 | |
| (Particulate Matter) | mg/km · t | 9.126 | 2.831 | 50 |
| Average Opacity | % | 4.623 | 2.382 | 25 |

Based on these results, an engine under the DT80 short test driving cycle using the LPG/diesel fuel mixture has significantly lower opacity, significantly lower particulate emissions, and lower $NO_x$ emissions on a per km basis in comparison with diesel.

The $NO_x$ emissions using the LPG/diesel mixture are only 45.7% of that allowable by the DNEPM (Diesel Vehicle Emission National Environment Protection Measure) limits. Particulate matter emissions are only 5.7% of that allowable by DNEPM limits and average opacity is 9.5% of that allowable by DNEPM limits. In summary, the emission levels using LPG/diesel mixture are substantially lower than that allowable by DNEPM limits.

ADVANTAGES

The preferred embodiment of the dual fuel system has the advantage that LPG can be mixed with diesel at comparatively high ratios and used as a liquid fuel mixture in the combustion chamber. Unlike other dual fuel systems, the diesel manufacturer's specifications are not altered and manufacturer's warranties are maintained. The advantage of the preferred embodiment arises from mixing liquid LPG and diesel to form a liquid fuel mixture which can be distributed via the common rail to the combustion chambers. Other dual fuel systems use LPG in a gaseous state often introducing LPG with the induction air.

The advantage of the dual fuel system of the preferred embodiment is that only minor changes are required to the diesel engine, a cleaner emission is produced and less frequent servicing including oil changes is required. The dual fuel system of the preferred embodiment takes advantage of the relative cheapness and abundant supply of LPG compared with diesel and petrol fuels. This relative cheapness can be translated into operational cost savings for vehicles with diesel engines.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A dual fuel system assembly for installation with an internal combustion diesel engine including
    a fuel tank to store pressurized liquefied gas;
    a proportioning valve means operatively connectable to the fuel tank and adapted to control the flow of the liquefied gas wherein the ratio of liquefied gas to diesel is predetermined; and
    a mixing chamber operatively connectable to the proportioning valve and adapted to mix a proportioned flow of the liquefied gas and a proportioned flow of diesel to form a liquid fuel mixture, wherein in use the assembly can provide the liquid fuel mixture to a combustion chamber of the diesel engine; characterized in that excess unburnt fuel mixture is collected in an overflow tank and returned to the mixing chamber for combustion in the combustion chamber.

2. A dual fuel system assembly as claimed in claim 1 wherein the proportioning valve means includes a flow control valve operatively controlled by an electronic control board, said electronic control board controls the flow control valve in response to processed information from the vehicle electronic control unit.

3. A dual fuel system assembly as claimed in claim 1 or 2 wherein the diesel fuel is pressurized prior to entering the mixing chamber and the diesel fuel is pressurized by an inline pump and the fuel is stored within a pressurized tank prior to use.

4. A dual fuel system assembly as claimed in claim 1 or 2 wherein the supply of pressurized diesel fuel to the mixing chamber is regulated by a flow control valve that is operatively controlled by an electronic control board, the electronic control board is controlled by the vehicle electronic control unit that receives and processes information to provide a relevant signal to the electronic control board.

5. A dual fuel system assembly as claimed in claim 1 or 2 wherein the liquefied gas is filtered before the proportioning valve with an inline filter.

6. A dual fuel system assembly as claimed in claim 1 or 2 wherein the LPG tank, proportioning valve means and mixing chamber are linked by a gas pipeline with at least one closeable valve between the LPG tank and the proportioning valve.

7. A dual fuel system assembly as claimed in claim 1 or 2 wherein the liquefied gas tank stores LPG under pressure of about 150 psi (1030 kpa) but above its vapor pressure of 80 psi (550 kpa).

8. A dual fuel system assembly as claimed in claim 1 or 2 wherein the ratio of LPG to diesel is a predetermined ratio which may vary between 50:50 and 90:10 respectively.

9. A dual fuel system assembly as claimed in claim 1 or 2 wherein the ratio of LPG to diesel is a predetermined ratio of approximately 70:30 respectively.

10. A dual fuel system assembly as claimed in claim 1 or 2 wherein the liquid fuel mixture is pumped to a common rail operable under high pressure so that the liquid fuel mixture remains in a liquid state, the common rail is connected to an injector for each combustion chamber and the fuel mixture is distributed to each of the injectors for combustion.

11. A dual fuel system assembly as claimed in claim 1 or 2, wherein the liquid fuel mixture is pumped to a common rail operable under high pressure so that the liquid fuel mixture remains in a liquid state, the common rail is connected to an injector for each combustion chamber and the fuel mixture is distributed to each of the injectors for combustion and wherein the fuel mixture is filtered prior to distribution in the common rail.

12. A dual fuel system assembly as claimed in claim 1 or 2 wherein the excess fuel mixture is returned via a fuel temperature sensor to a fuel pressure limiter then to an overflow valve and a pressure limiting valve, the excess fuel is then passed through a fuel cooler and maintained under pressure in a pressurized tank for subsequent reintroduction into the mixing chamber.

13. A dual fuel system assembly as claimed in claim 1 or 2 wherein there is a separate line from a diesel tank to a supply pump and subsequently to the engine to use diesel as the sole fuel source.

* * * * *